United States Patent
Yanagisawa et al.

(10) Patent No.: US 8,651,668 B2
(45) Date of Patent: Feb. 18, 2014

(54) PROJECTOR

(75) Inventors: Yoshiyuki Yanagisawa, Matsumoto (JP); Yasunaga Momose, Tatsuno-machi (JP)

(73) Assignee: Seiko Epson Corporation, Tokyo (JP)

( * ) Notice: Subject to any disclaimer, the term of this patent is extended or adjusted under 35 U.S.C. 154(b) by 197 days.

(21) Appl. No.: 12/730,423

(22) Filed: Mar. 24, 2010

(65) Prior Publication Data

US 2010/0245778 A1     Sep. 30, 2010

(30) Foreign Application Priority Data

Mar. 25, 2009   (JP) .................................. 2009-074215

(51) Int. Cl.
   *G03B 21/18*   (2006.01)
(52) U.S. Cl.
   USPC ............................................ 353/54; 165/80.4
(58) Field of Classification Search
   USPC ...................... 353/51–62; 165/80.4
   See application file for complete search history.

(56) References Cited

U.S. PATENT DOCUMENTS

| 7,384,152 B2 | 6/2008 | Takeuchi |
| 7,815,315 B2 * | 10/2010 | Momose et al. ................ 353/52 |
| 2007/0068653 A1 * | 3/2007 | Kondou et al. .............. 165/80.4 |

FOREIGN PATENT DOCUMENTS

| JP | 2005-215022 A | 8/2005 |
| JP | 2005-321456 A | 11/2005 |
| JP | 2005-331928 A | 12/2005 |
| JP | 2006-227306 A | 8/2006 |
| JP | 2007-264590 A | 10/2007 |

* cited by examiner

*Primary Examiner* — Francis M Legasse, Jr.
*Assistant Examiner* — Jerry Brooks
(74) *Attorney, Agent, or Firm* — ALG Intellectual Property, LLC (57) ABSTRACT

A projector includes: a liquid-cooling device configured to cool down a cooling target using cooling liquid, a liquid storage unit including a storage unit body that temporarily stores cooling liquid therein; and an outflow portion that connects the inside and outside of the storage unit body and allows the cooling liquid stored in the storage unit body to flow out to the outside, and the liquid storage unit is disposed in such a manner that the cooling liquid flows out of the outflow portion in a direction substantially orthogonal to a projection direction of an image from the projector and substantially parallel to a horizontal plane.

7 Claims, 8 Drawing Sheets

PROJECTOR

BACKGROUND

1. Technical Field

The present invention relates to a projector.

2. Related Art

In the related art, a projector is provided with a circulation-type liquid-cooling device to circulate cooling liquid along a flow path such that a cooling target such as a liquid crystal panel is effectively cooled down by the circulated cooling liquid.

In such a liquid-cooling device, cooling liquid may evaporate as the cooling liquid has been used over the years. In this case, bubbles may occur in the flow path. Furthermore, when the amount of bubbles increases, it makes it difficult for the cooling liquid to circulate along the flow path. As a result, the cooling efficiency for the cooling target may decrease.

Therefore, in the related art, a technique in which a reserve tank (liquid storage unit) captures bubbles so as to remove bubbles in the flow path has been adopted (refer to JP-A-2005-331928).

Specifically, the liquid storage unit disclosed in JP-A-2005-331928 includes a tank which temporarily stores cooling liquid therein and inflow and outflow nozzles through which cooling liquid flows into and out of the tank.

When cooling liquid containing bubbles flows into the tank, the bubbles move to the upper space inside the tank due to their buoyancy. At this time, the bubbles are captured in the space, and only the cooling liquid flows to the outside through the outflow nozzle.

The liquid storage unit disclosed in JP-A-2005-331928 has been designed on the assumption that a projector projects an image at a normal posture such that the image is projected in a substantially horizontal direction. At the normal posture, the projector is loaded on an installation surface of a desk or the like. In other words, the liquid storage unit is designed in such a manner that when the projector is installed at the normal posture, bubbles are captured in the tank and only the cooling liquid flows out of the tank.

Therefore, when the projector is installed at an upward projection posture where the projector projects an image upward or a downward projection posture where the projector projects an image downward, bubbles may flow out of the tank. At the upward projection posture, a projection lens is positioned upward. At the downward projection posture, the projection lens is positioned downward.

Specifically, the liquid storage unit disclosed in JP-A-2005-331928 is constructed in such a manner that the outflow nozzle is provided in a direction along the projection direction with respect to the tank, and the cooling liquid flows out to the opposite side of the projection direction. Therefore, when the projector is installed at the downward projection posture, the liquid storage unit is postured in such a manner that the outflow nozzle is positioned on the upper side wall in the tank, and the cooling liquid flows out from the upper side through the outflow nozzle. That is, bubbles flowing with the cooling liquid into the tank move to the internal space of the tank at the upper side (where the outflow nozzle is positioned) due to their buoyancy, and then flows to the outside through the outflow nozzle.

Therefore, a technique is being demanded, which prevents bubbles captured by the liquid storage unit from flowing out of the liquid storage unit, and effectively cools down a cooling target using cooling liquid, even when the projector is installed at various postures.

SUMMARY

An advantage of some aspects of the invention is that it provides a projector which effectively cools down a cooling target using cooling liquid, even when the projector is installed at various postures.

According to an aspect of the invention, there is provided a projector includes a liquid-cooling device configured to cool down a cooling target using cooling liquid. A liquid storage unit having a storage unit body that temporarily stores cooling liquid therein; and an outflow portion that connects the inside and outside of the storage unit body and allows the cooling liquid stored in the storage unit body to flow out to the outside. The liquid storage unit is disposed in such a manner that the cooling liquid flows out of the outflow portion in a direction substantially orthogonal to a projection direction of an image from the projector and substantially parallel to a horizontal plane.

According to the aspect of invention, the liquid storage unit is disposed in such a manner that the cooling liquid flows out of the outflow portion in the direction substantially orthogonal to the projection direction of an image from the projector and substantially parallel to the horizontal plane. Accordingly, even when the projector is installed at the normal posture, the upward projection posture, or the downward projection posture, the liquid storage unit does not have such a posture that the outflow portion is positioned at the upper side wall of the storage unit body.

Therefore, even when the projector is installed at various positions, bubbles captured in the upper space inside the storage unit body are prevented from flowing to the outside through the outflow portion, which makes it possible to cool down the cooling target using the cooling liquid effectively.

In the projector according to the aspect of the invention, the outflow portion may be provided at a position where a height from a lower surface portion of the storage unit body corresponds to the half or less of a height from the lower surface portion of the storage unit body to an upper surface portion thereof.

The lower and upper surface portions of the storage unit body mean lower and upper side walls of the storage unit body, respectively, in a state in which the projector is installed at the normal posture.

If the outflow portion is provided at a position where the height from the lower surface portion corresponds to the half or less of the height of the storage unit body, the outflow portion can be positioned downward in the storage unit body, in a state in which the projector is installed at the normal posture.

Therefore, when the projector is installed at the normal posture, the bubbles captured in the upper space inside the storage unit body are prevented from flowing to the outside through the outflow portion.

In the projector according to the aspect of the invention, the outflow portion may be provided at a substantially central position in the front and back direction of the storage unit body along the projection direction.

If the outflow portion is provided at a substantially central position in the front and back direction of the storage unit body along the projection direction, the outflow portion can be positioned at a substantially central position (the substantially central position in the front and back direction along the projection direction) in the upward and downward direction of the storage unit body in a state where the projector is installed in an upward projection posture or a downward projection posture.

Therefore, when the projector is installed at the upward projection posture or the downward projection posture, the bubbles captured in the upper space inside the storage unit body are prevented from flowing to the outside through the outflow portion.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments of the invention will be described with reference to the drawings.

Construction of Projector

Figure 1:
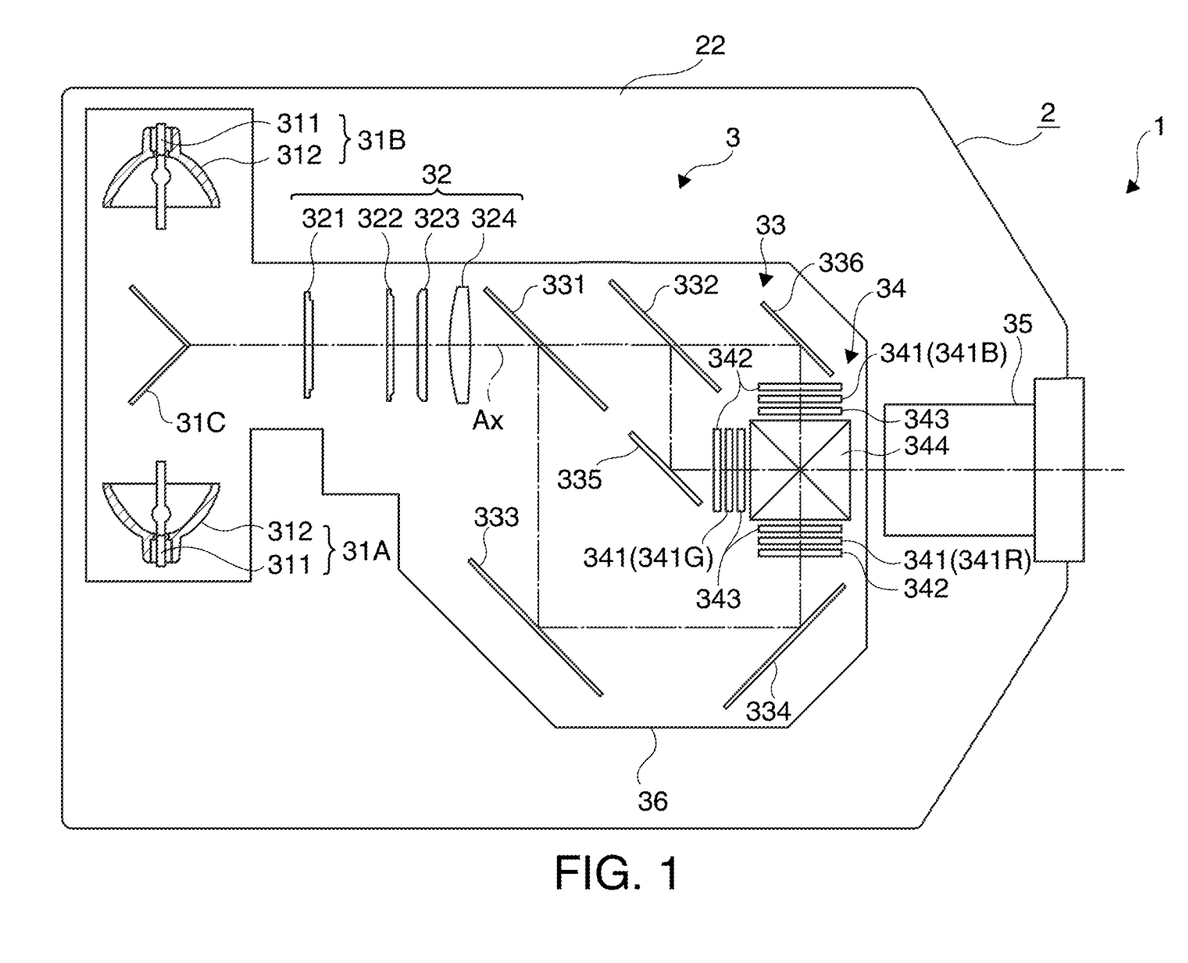
FIG. 1 is a diagram illustrating the schematic construction of a projector according to an embodiment of the invention.

FIG. 1 is a diagram illustrating the schematic construction of a projector 1 according to an embodiment of the invention. Specifically, FIG. 1 is a diagram illustrating a state in which the internal structure of the projector 1 is seen from the side of a top surface portion 21 (refer to FIGS. 7A to 7C) of an exterior chassis 2.

In the following descriptions, a side in which a projection lens 35 (FIG. 1) is disposed is set to 'front surface', and the opposite side thereof is set to 'rear surface', for convenience of explanation.

The projector 1 forms an image in accordance with image information and projects the formed image onto a screen (not shown) such that the projected image is displayed on the screen. Referring to FIG. 1, the projector 1 includes an exterior chassis 2 forming the exterior of the projector 1, an optical unit 3, and a liquid-cooling device 4 (refer to FIG. 2).

The exterior chassis 2 is formed in a substantially rectangular parallelepiped shape having a top surface portion 21 (refer to FIGS. 7A to 7C) and a bottom surface portion 22 (refer to FIG. 1) which cross the vertical direction when the projector 1 is installed at the normal posture. The optical unit 3 and the liquid-cooling device 4 are housed in the exterior chassis 2.

The exterior chassis 2 includes a pair of handles 21A (refer to FIGS. 7A to 7C) fixed to the top surface portion 21.

Figure 7A:
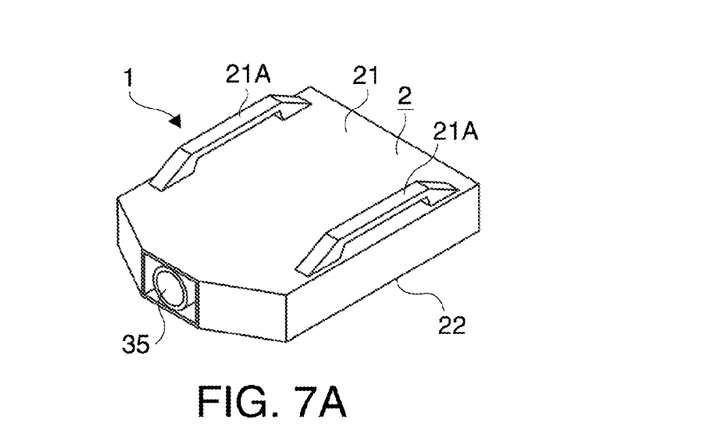
FIGS. 7A to 7C are diagrams explaining a bubble capture structure by the tank according to the embodiment of the invention.
Figure 7B:
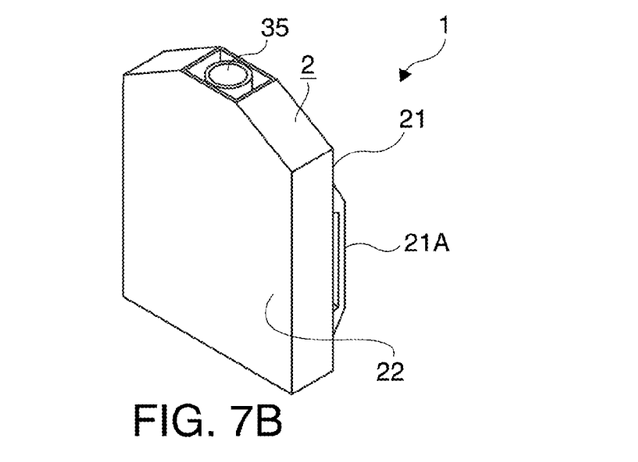
Figure 7C:
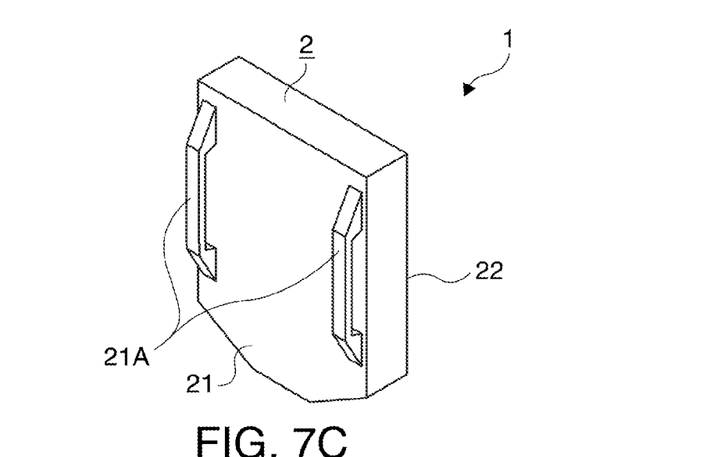

The pair of handles 21A formed in a substantially U shape are members grasped by a user when the projector 1 is carried.

Furthermore, the pair of handles 21A are disposed in parallel to each other, and both ends of each handle 21A formed in a U shape are fixed to the top surface portion 21 such that the handle 21A extends in the front and back direction, i.e., the direction along the projection direction of an image from the projection lens 35.

A pair of the handles 21A includes a plurality of screw holes formed therein, although the screw holes are not illustrated specifically. When the projector 1 is installed in a suspended posture, suspension clamps are fixed to the screw holes. In the suspended posture, the projector 1 is suspended from the ceiling or the like.

That is, when the projector 1 according to the embodiment of the invention is installed in the suspended posture, the projector 1 has the same posture as the normal posture where the top surface portion 21 faces upward and the bottom surface portion 22 faces downward.

Construction of Optical Unit

The optical unit 3 forms and projects an image in accordance with image information, under the control of a control device (not shown).

Referring to FIG. 1, the optical unit 3 includes a pair of light source devices 31A and 31B, a reflecting mirror 31C, an illumination optical device 32 having lens arrays 321 and 322, a polarization conversion element 323, and a superimposed lens 324, a color separation optical device 33 having dichroic mirrors 331 and 332 and reflecting mirrors 333 to 336, an optical device 34 having three liquid crystal panels 341 (a red-light-side liquid crystal panel 341R, a green-light-side liquid crystal panel 341G, and a blue-light-side liquid crystal panel 341B) serving as light modulation elements, three incident-side polarization plates 342, and three emission-side polarization plates 343, a cross dichroic prism 344 serving as a color composition optical device, a projection lens 35 serving as a projection optical device, and an optical part chassis 36 housing the respective members 31A, 31B, and 32 to 34 therein.

As illustrated in FIG. 1, the pair of light source devices 31A and 31B have the same construction and include a light source lamp 311 and a reflector 312. The pair of light source devices 31A and 31B are disposed to face each other and interpose the reflecting mirror 31C such that light fluxes are emitted toward the reflecting mirror 31C.

In the optical unit 3, the light fluxes emitted from the pair of light source devices 31A and 31B are reflected along an illumination optical axis Ax (FIG. 1) set inside the optical part chassis 36 by the reflecting mirror 31C, and then irradiated onto the illumination optical device 32. The light fluxes irradiated onto the illumination optical device 32 are separated into three color (R, G, and B) lights by the color separation optical device 33, while the in-plane illumination of the light fluxes is uniformized by the illumination optical device 32. The respective light crystal panels 341 modulate the separated color lights in accordance with image information so as to form images corresponding to the respective color lights. The images corresponding to the respective color lights are composed by the prism 344 and then projected onto a screen (not shown) by the projection lens 35.

Construction of Liquid-Cooling Device

Figure 2:
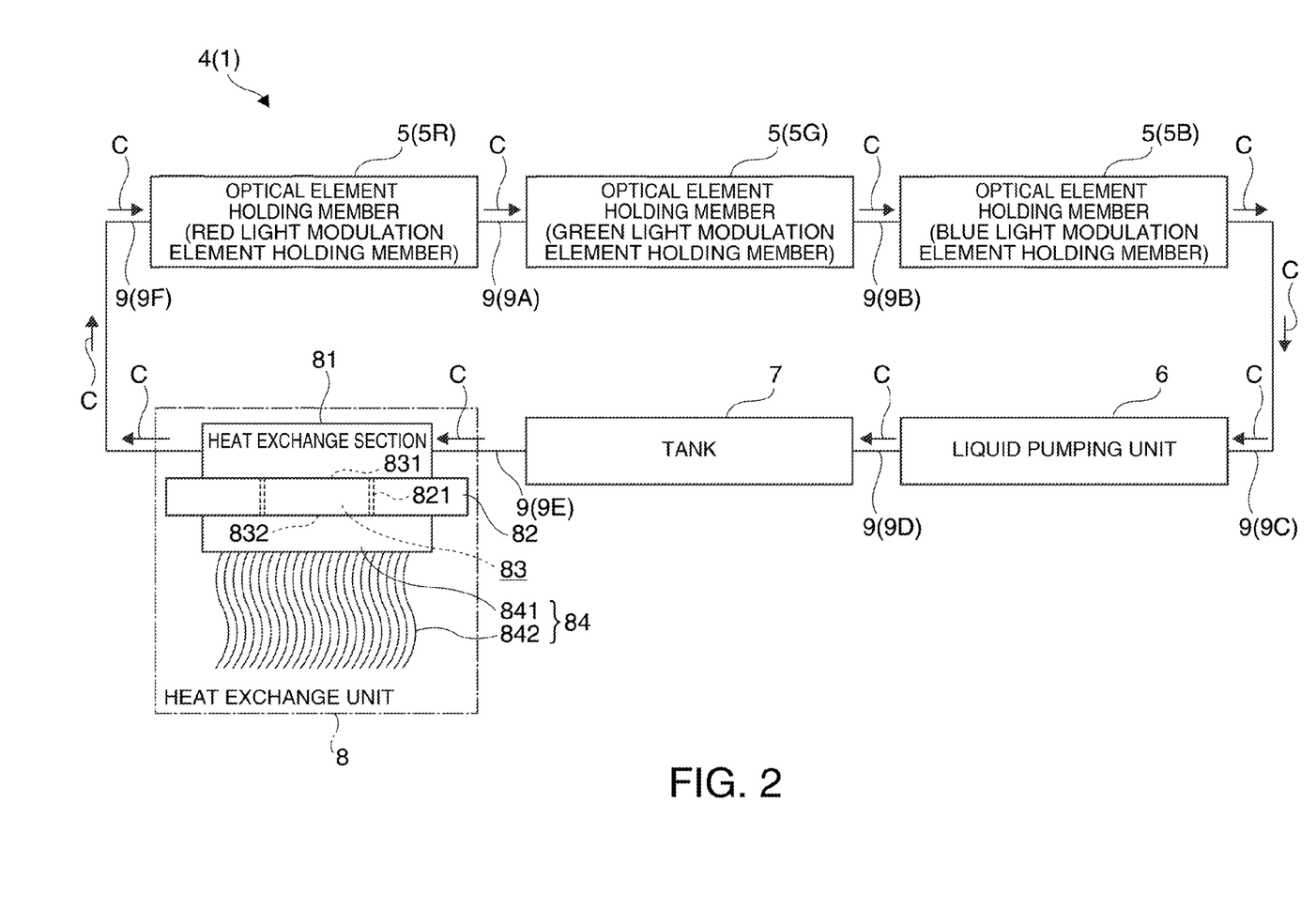
FIG. 2 is a diagram schematically illustrating the construction of a liquid-cooling device according to the embodiment of the invention.

FIG. 2 is a diagram schematically illustrating the construction of the liquid-cooling device 4.

The liquid-cooling device 4 circulates cooling liquid such as water or ethylene glycol along a ring-shaped flow path and cools down the liquid crystal panels 341 serving as optical elements by using the cooling liquid. Referring to FIG. 2, the liquid-cooling device 4 includes three optical element holding members 5, a liquid pumping unit 6, a tank 7 serving as a liquid storage unit, a heat exchange unit 8, and a plurality of liquid circulation members 9.

The plurality of liquid circulation members 9 are constructed as pipe-shaped members capable of circulating cooling liquid therein and connect the respective units 5 to 8 to form a ring-shaped flow path.

The connection structure of the respective units 5 to 8 by the liquid circulation members 9 will be described later.

Construction of Optical Element Holding Member

Figure 3:
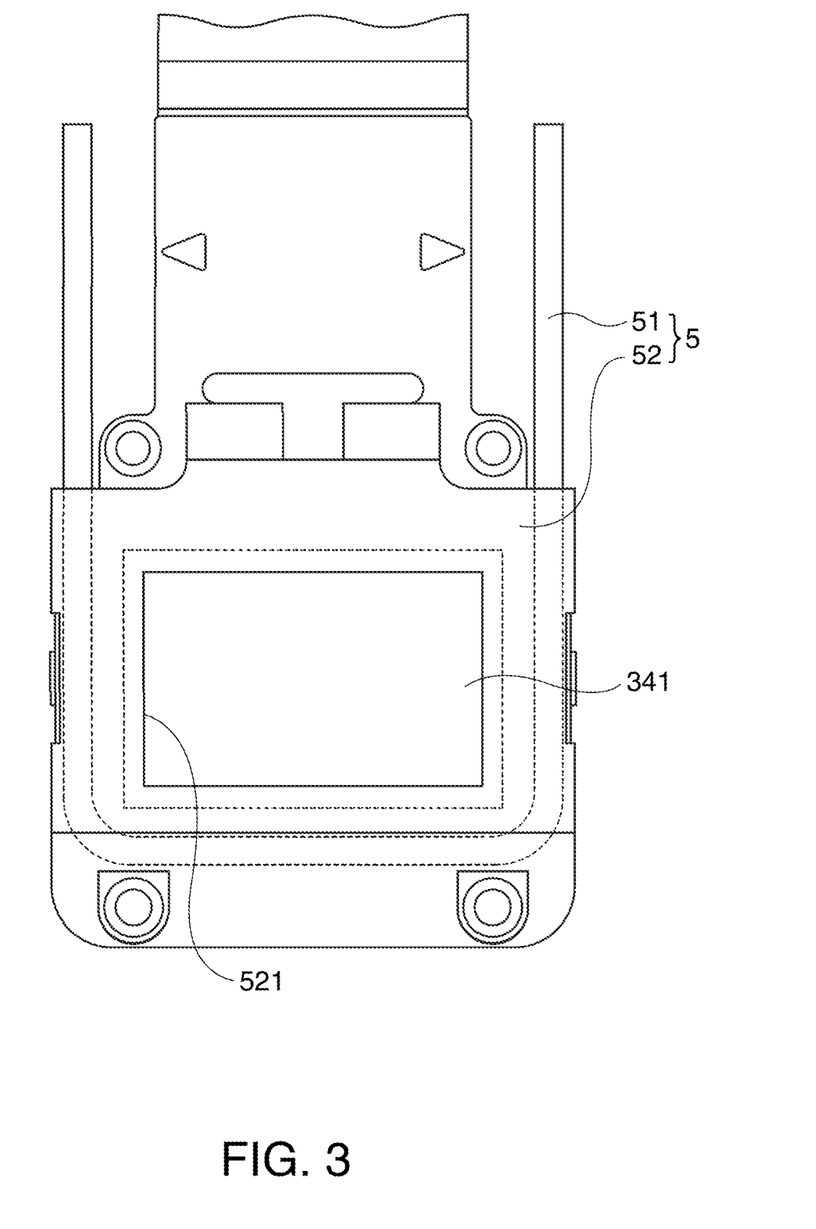
FIG. 3 is a diagram illustrating the structure of an optical element holding member according to the embodiment of the invention.

FIG. 3 is a diagram illustrating the structure of an optical element holding member 5. Specifically, FIG. 3 is a plan view in which the optical element holding member 5 is seen from a light flux incident side.

The three optical element holding members 5 hold the three liquid crystal panels 341, respectively, and cooling liquid flows into and out of the optical element holding members 5 to cool down the three liquid crystal panels 341. Since the respective optical element holding members 5 have the same construction, the following descriptions will be focused on only one of the optical element holding members 5. Referring to FIG. 3, the optical element holding member 5 includes a liquid circulation pipe 51 and an optical element support frame 52.

The liquid circulation pipe 51 is bent to surround an image formation region (light transmission region) of the liquid crystal panel 341 in a plan view, and both ends of the liquid circulation pipe 51, through which cooling liquid flows in and out, extend upward (toward the top surface portion 21) in parallel to each other.

The optical element support frame 52 has a concave portion which is recessed toward the light-flux incident side so as to correspond to the exterior shape of the liquid crystal panel 341 in the light-flux emission side, although the concave portion is not illustrated specifically. The optical element support frame 52 houses and holds the liquid crystal panel 341 in the concave portion.

As illustrated in FIG. 3, the concave portion includes an opening portion 521 formed in the bottom thereof, the opening portion 521 corresponding to the image formation region of the liquid crystal panel 341.

The optical element support frame 52 includes a throughhole which is formed through the optical element support frame 52 so as to surround the concave portion and is U-shaped in a plan view, although the through-hole is not illustrated specifically. The liquid circulation pipe 51 is disposed in the through-hole.

Although not illustrated specifically, the optical element support frame 52 is divided into two frames, that is, a lightflux incident-side frame and a light-flux emission-side frame, and the liquid circulation pipe 51 is interposed by the two frames.

As described above, the optical element holding member 5 is disposed in such a manner that the liquid circulation pipe 51 faces the side end portion of the liquid crystal panel 341, and the heat of the liquid crystal panel 341 dissipates along a heat transmission path connecting the liquid crystal panel 341, the optical element support frame 52, and the liquid circulation pipe 51.

Construction of Liquid Pumping Unit

The liquid pumping unit 6 is a pump which sucks and pumps cooling liquid and circulates the cooling liquid along a ring-shaped flow path.

The liquid pumping unit 6 has an impeller disposed in a hollow member thereof. The liquid pumping unit 6 rotates the impeller to suck and pump the cooling liquid.

The liquid pumping unit 6 is not limited to the above-described construction in which the impeller is provided, but another construction using a diaphragm may be adopted.

Construction of Tank

Figure 4:
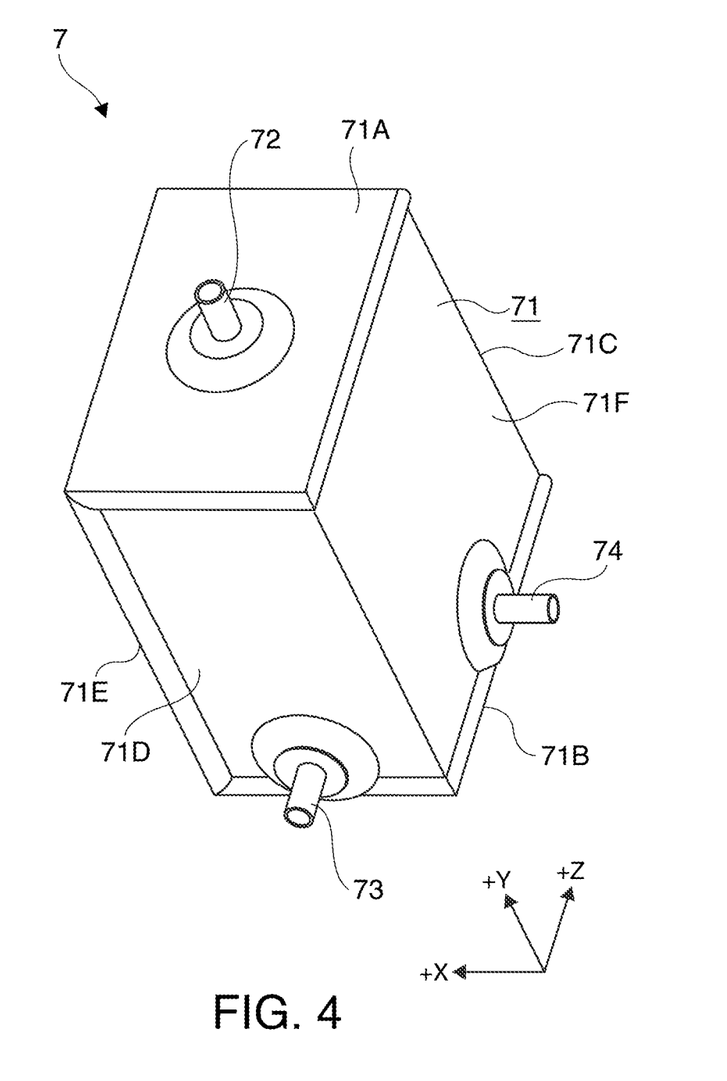
FIG. 4 is a perspective view illustrating the construction of a tank according to the embodiment of the invention.

FIG. 4 is a perspective view illustrating the construction of the tank 7.

For convenience of explanation, the following descriptions will be made using a vertical axis (Y-axis) illustrated in FIG. 4 and X- and Z-axes orthogonal to the Y-axis.

The tank 7, which is formed of a metallic material such as aluminum or the like, temporarily stores cooling liquid which has flown in, and then discharges the stored cooling liquid. Furthermore, the tank 7 captures bubbles contained in cooling liquid which circulates through the ring-shaped flow path.

The bubble capture structure by the tank 7 will be described later.

Referring to FIG. 4, the tank 7 includes a storage unit body 71, an injection portion 72, an inflow portion 73, and an outflow portion 74.

The storage unit body 71 formed of a hollow member having a rectangular parallelepiped shape includes upper and lower surface portions 71A and 71B crossing the Y-axis, front and rear surface portions 71C and 71D crossing the Z-axis, and a pair of side surface portions 71E and 71F crossing the X-axis.

The injection portion 72 is a member for injecting cooling liquid into the storage unit body 71. As illustrated in FIG. 4, the injection portion 72 has a pipe shape and is provided in the top surface portion 71A of the storage unit body 71 so as to connect the inside and outside of the storage unit body 71.

That is, as cooling liquid is injected through the injection portion 72 after the liquid-cooling device 4 is assembled, the liquid-cooling device 4 is filled with the cooling liquid.

The injection portion 72 includes a cap for sealing the injection portion 72 attached after the cooling liquid is injected, although the cap is not illustrated specifically in FIG. 4.

The inflow portion 73 is a member through which cooling liquid flows into the storage unit body 71, the cooling liquid circulating through the ring-shaped flow path. As illustrated in FIG. 4, the inflow portion 73 has a pipe shape and is provided in the rear surface portion 71D of the storage unit body 71 so as to connect the inside and outside of the storage unit body 71.

As illustrated in FIG. 4, the inflow portion 73 is provided at a position adjacent to the lower surface portion 71B and a substantially central position in the X-axis direction on the rear surface portion 71D.

The outflow portion 74 is a member through which cooling liquid inside the storage unit body 71 flows to the outside. As illustrated in FIG. 4, the outflow portion 74 has a pipe shape and is provided in the side surface portion 71F which is positioned in the −X-axis side between the pair of side surface portions 71E and 71F of the storage unit body 71, so as to connect the inside and outside of the storage unit body 71.

As illustrated in FIG. 4, the outflow portion 74 is provided at a position adjacent to the lower surface portion 71B and a substantially central position in the Z-axis direction on the side surface portion 71F. The position adjacent to the lower surface portion 71B is where a height H1 (refer to FIG. 6B) from the lower surface portion 71B corresponds to the half or less of a height H2 (refer to FIG. 6B) from the lower surface portion 71B to the upper surface portion 71A of the storage unit body 71.

Construction of Heat Exchange Unit

The heat exchange unit 8 reduces the temperature of cooling liquid circulating along the ring-shaped flow path. Referring to FIG. 2, the heat exchange unit 8 includes a heat exchange section 81, a compartment plate 82, a Peltier element 83 serving as a thermoelectric conversion element, and a heat-dissipation-side heat transmission member 84.

Figure 5:
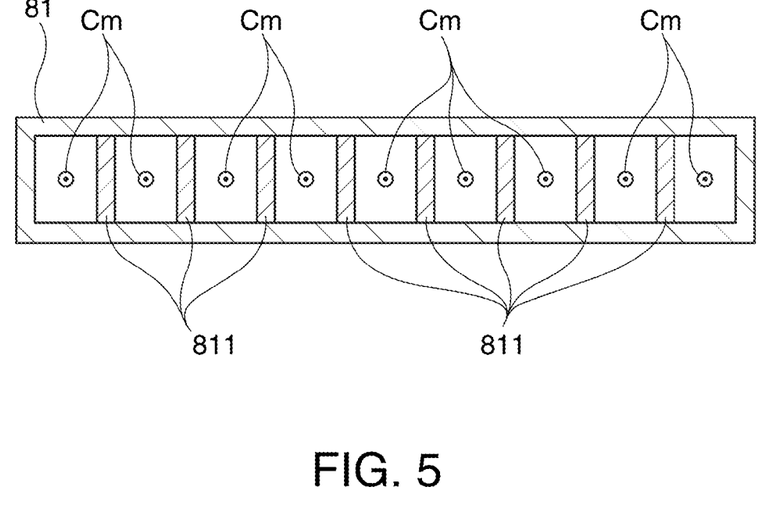
FIG. 5 is a cross-sectional view schematically illustrating the internal structure of a heat exchange section according to the embodiment of the invention.

FIG. 5 is a cross-sectional view schematically illustrating the internal structure of the heat exchange section 81. Specifically, FIG. 5 illustrates the cross-section of the heat exchange section 81 taken along a plane crossing the flow path at right angles.

The heat exchange section 81 is constructed by a hollow member having a rectangular parallelepiped shape, and exchanges heat with cooling liquid circulating therein.

Referring to FIG. 5, the heat exchange section 81 includes a plurality of plate bodies 811 which extend along the circulation direction of cooling liquid and are arranged in parallel to each other in a direction crossing the circulation direction at right angles. Specifically, these plate bodies 811 have a thickness of several ten μm to several hundred μm, for example, and are arranged with an interval of several ten μm to several hundred μm provided therebetween.

In accordance with the above-described construction, a plurality of minute channels Cm (FIG. 5) through which cooling liquid circulates among the respective plate bodies 811 are formed inside the heat exchange section 81. That is, the heat exchange section 81 is constructed as a heat exchanger such as a so-called micro channel.

The compartment plate 82, which is formed of a plate body having a rectangular shape in a plan view, compartmentalizes the heat exchange section 81 and the heat-dissipation-side heat transmission member 84 while integrating the heat exchange section 81, the Peltier element 83, and the heat-dissipation-side heat transmission member 84. The compartment plate 82 is formed of a material having a low thermal conductivity (for example, 0.9 W/(m·K) or less).

Referring to FIG. 2, the compartment plate 82 has a rectangular shape smaller than the plan shape of the heat exchange section 81 and includes an opening portion 821 into which the Peltier element 83 is fitted.

The heat exchange section 81 is fixed to the peripheral portion of the opening portion 821 on one plate surface of the compartment plate 82 so as to block the opening 821.

The Peltier element 83 includes a plurality of junction pairs of which each is constructed by joining a p-type semiconductor and an n-type semiconductor through a metal piece, although the junction pairs are not illustrated specifically. The plurality of junction pairs are electrically and directly connected to each other.

When electric power is supplied to the Peltier element 83 constructed in such a manner, one end surface of the Peltier element 83 becomes a heat suction surface 831 which sucks heat, and the other end surface thereof becomes a heat dissipation surface 832 which dissipates heat, as illustrated in FIG. 2.

The Peltier element 83 is fitted into the opening portion 821 of the compartment plate 82, and the heat suction surface 831 is connected to the heat exchange section 81 so as to transfer heat.

Referring to FIG. 2, the heat-dissipation-side heat transmission member 84 includes a rectangular plate body 841 and a plurality of fin members 842 protruding from the plate body 841. That is, the heat transmission member 82 is constructed as a so-called heat sink. The heat-dissipation-side heat transmission member 84 is fixed to the peripheral portion of the opening portion 821 on the other plate surface of the compartment plate 82 so as to block the opening portion 821. In this state, the heat-dissipation-side heat transmission member 84 is connected to the heat-dissipation surface 832 of the Peltier element 83 to transfer heat.

That is, the heat transmission path connecting the heat exchange section 81, the Peltier element 83, and the heat-dissipation-side heat transmission member 84 is formed in such a state that the respective members 81, 83, and 84 are integrated by the compartment plate 82.

Therefore, as the Peltier element 83 is driven, the heat suction surface 831 sucks heat to cool down the heat exchange section 81. Furthermore, the heat generated from the heat-dissipation surface 832 of the Peltier element 83 is dissipated to the outside through the heat-dissipation-side heat transmission member 84.

Connection Structure by Liquid Circulation Member

Next, the connection structure of the respective units 5 to 8 by the liquid circulation member 9 will be described.

For convenience of description, among the three optical element holding members 5, the optical element holding member which holds the red-light-side liquid crystal panel 341R is set to a red light modulation element holding member 5R, the optical element holding member which holds the green-light-side liquid crystal panel 341G is set to a green light modulation element holding member 5G, and the optical element holding member which holds the blue-light-side liquid crystal panel 341B is set to a blue light modulation element holding member 5B, as illustrated in FIG. 2.

Referring to FIG. 2, the liquid circulation member 9 includes six first to sixth liquid circulation members 9A to 9F.

Specifically, the first liquid circulation member 9A has an inflow side connected to one end of the liquid circulation pipe 51 in the red light modulation element holding member 5R and an outflow side connected to one end of the liquid circulation pipe 51 in the green light modulation element holding member 5G.

The second liquid circulation member 9B has an inflow side connected to the other end of the liquid circulation pipe 51 in the green light modulation element holding member 5G and an outflow side connected to one end of the liquid circulation pipe 51 in the blue light modulation element holding member 5B.

The third liquid circulation member 9C has an inflow side connected to the other end of the liquid circulation pipe 51 in the blue light modulation element holding member 5B and an outflow side connected to the liquid pumping unit 6.

The fourth liquid circulation member 9D has an inflow side connected to the liquid pumping unit 6 and an outflow side connected to the inflow portion 73 of the tank 7.

The fifth liquid circulation member 9E has an inflow side connected to the outflow portion 74 in the tank 7 and an outflow side connected to the heat exchange section 81, respectively.

The sixth circulation member 9F has an inflow side connected to the heat exchange section 81 and an outflow side connected to the other end of the liquid circulation pipe 51 in the red light modulation element holding member 5R.

Such a connection structure by the liquid circulation members 9 forms a ring-shaped flow path C which starts from the red light modulation element holding member 5R, sequentially passes through the green light modulation element holding member 5G, the blue light modulation element holding member 5B, the liquid pumping unit 6, the tank 7, and the heat exchange section 81, and then returns to the red light modulation element holding member 5R.

The liquid crystal panel 341 is cooled down by the above-described liquid-cooling device 4. The cooling operation will be described as follows.

That is, heat generated by the liquid crystal panel 341 is transferred to cooling liquid through the optical element holding member 5.

The cooling liquid flowing out from the optical element holding member 5 flows into the heat exchange section 81 along the flow path C.

At this time, as the Peltier element 83 is driven, the heat suction surface 831 sucks the heat to cool down the heat exchange section 81. Therefore, when the cooling liquid flowing into the heat exchange section 81 passes through the internal minute flow paths Cm, heat exchange is performed between the spaces of the heat exchange section 81 such that the cooling liquid is cooled down.

The cooling liquid cooled down by the heat exchange section 81 flows into the optical element holding member 5 once again.

Bubble Capture Structure by Tank

Before a bubble capture structure by the tank 7 is described, the positional relation of the tank 7 with respect to the projection lens 35 will be described.

Figure 6A:
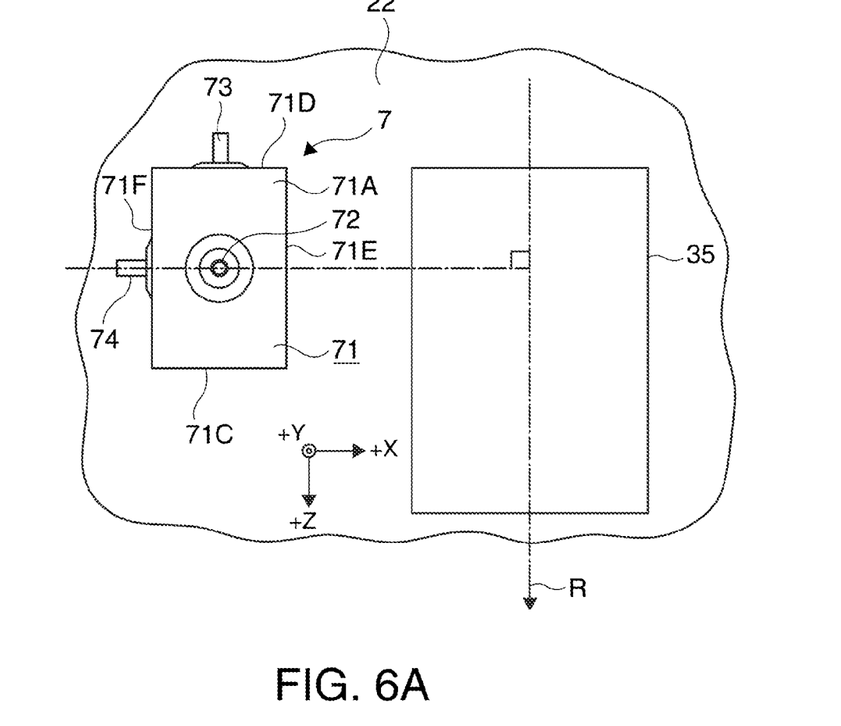
FIGS. 6A and 6B are diagrams schematically illustrating the positional relation between a projection lens and the tank according to the embodiment of the invention.
Figure 6B:
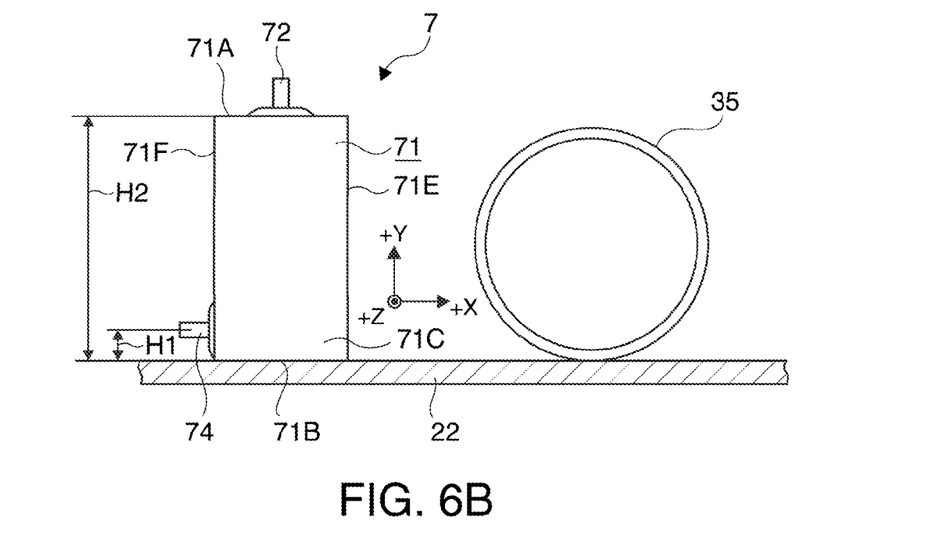

FIGS. 6A and 6B are diagrams schematically illustrating the positional relation between the projection lens 35 and the tank 7. Specifically, FIG. 6A is a diagram seen from the side of the top surface portion 21, and FIG. 6B is a diagram seen from the front surface side.

Referring to FIGS. 6A and 6B, the tank 7 is disposed in the side of the projection lens 35.

Specifically, the tank 7 is disposed inside the exterior chassis 2 such that the lower surface portion 71B is positioned at the side of the bottom surface portion 22 and the +Z-axis direction (FIGS. 4 and 6) faces the projection direction R (FIGS. 6A and 6B).

That is, the tank 7 is disposed inside the exterior chassis 2 such that cooling liquid flows out of the outflow portion 74 in a direction substantially orthogonal to the projection direction R and substantially parallel to the horizontal plane.

As the tank 7 is disposed inside the exterior chassis 2 in the above-described manner, the tank 7 captures bubbles when the projector 1 is installed at various postures. The capturing process will be described as follows.

Figure 8A:
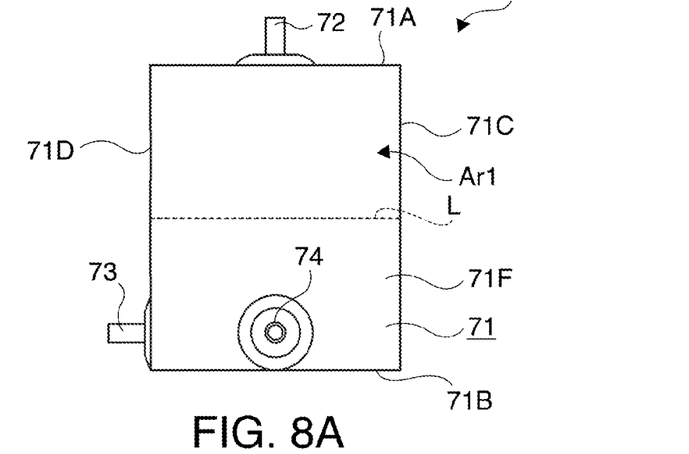
FIGS. 8A to 8C are diagrams explaining the bubble capture structure by the tank according to the embodiment of the invention.
Figure 8B:
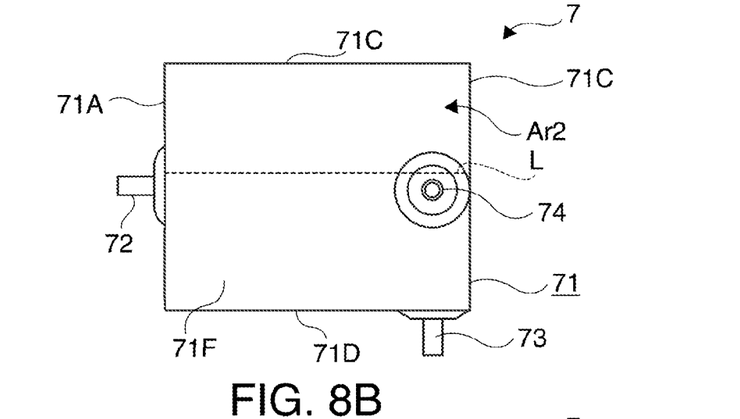
Figure 8C:
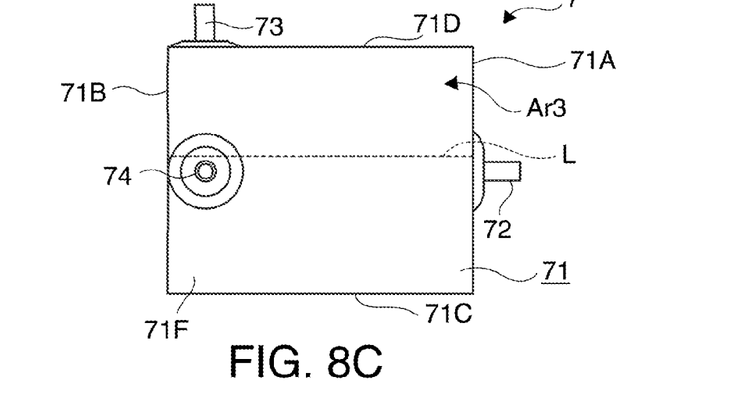

FIGS. 7A to 8C are diagrams explaining the bubble capture structure by the tank 7. Specifically, FIGS. 7A to 7C are diagrams schematically illustrating various postures of the projector 1, and FIGS. 8A to 8C are diagrams illustrating states in which the tank 7 is seen from the side surface portion 71F when the projector 1 is installed at the various postures.

In FIGS. 8A to 8C, an interface L between cooling liquid and air is indicated by a dashed line, for convenience of description.

When the projector 1 is installed at the normal posture illustrated in FIG. 7A, the tank 7 has such a posture that the upper surface portion 71A is positioned upward, as illustrated in FIG. 8A. When the projector 1 is installed at the suspended posture, the tank 7 has the same posture. Therefore, bubbles flowing with cooling liquid into the storage unit body 71 through the inflow portion 73 move upward due to their buoyancy, and are captured in a space Ar1 (FIG. 8A) inside the storage unit body 71 at the side of the upper surface portion 71A.

When the projector 1 is installed at the upward projection posture illustrated in FIG. 7B, the tank 7 has such a posture that the front surface portion 71C is positioned upward, as illustrated in FIG. 8B. At the upward projection posture, the projection lens 35 is positioned upward. Therefore, bubbles flowing with cooling liquid into the storage unit body 71 through the inflow portion 73 move upward due to their buoyancy, and are captured in a space Ar2 (FIG. 8B) inside the storage unit body 71 at the side of the front surface portion 71C.

When the projector 1 is installed at the downward projection posture illustrated in FIG. 7C, the tank 7 has such a posture that the rear surface portion 71D is positioned upward, as illustrated in FIG. 8C. At the downward projection posture, the projection lens 35 is positioned downward. Therefore, bubbles flowing with cooling liquid into the storage unit body 71 through the inflow portion 73 move upward due to their buoyancy, and are captured in a space Ar3 (FIG. 8C) inside the storage unit body 71 at the side of the rear surface portion 71D.

In the above-described embodiment of the invention, the following effects are obtained.

In the embodiment of the invention, the tank 7 is disposed in such a manner that cooling liquid flows out of the outflow portion 74 in a direction substantially orthogonal to the projection direction R and substantially parallel to the horizontal plane. Accordingly, even when the projector 1 is installed at the normal posture, the upward projection posture, or the downward projection posture, the tank 7 does not have such a posture that the outflow portion 74 is positioned at the upper side wall of the storage unit body 71, that is, the upper surface portion 71A at the normal posture, the front surface portion 71C at the upward projection posture, or the rear surface portion 71D at the downward projection posture.

Therefore, even when the projector 1 is installed at various postures, the bubbles captured in the space Ar1, Ar2, or Ar3 inside the storage unit body 71 at the upper side are prevented from flowing to the outside through the outflow portion 74.

Since bubbles are prevented from flowing out of the tank 7 even when the projector 1 is installed at various postures, it is possible to cool down the liquid crystal panel 341 effectively, as will be described below.

That is, as the bubbles are stored inside the storage unit body 71, the amount of bubbles contained in cooling liquid circulating along the flow path C decreases. Therefore, the cooling liquid smoothly circulates along the flow path C, which makes it possible to cool down the liquid crystal panel 341 effectively.

The heat exchange section 81 is constructed as a heat exchanger such as a so-called micro channel having a plurality of minute flow paths Cm provided therein. Therefore, when bubbles flow into the heat exchange section 81 with cooling liquid, the bubbles are captured by the plurality of plate bodies 811 so as not to escape to the outside of the heat exchange section 81. As such, when the bubbles exist inside the heat exchange section 81, the bubbles may function as a heat-insulating layer such that the heat exchange is not favorably performed between the heat exchange section 81 and the cooling liquid.

In the embodiment of the invention, before cooling liquid flows into the heat exchange section 81, bubbles are captured by the tank 7, and are prevented from flowing out of the tank 7. Therefore, the bubbles are prevented from flowing into the heat exchange section 81 with the cooling liquid. That is, it is possible to avoid a state in which bubbles exist inside the heat exchange section 81. Furthermore, since the heat exchange is favorably performed between the heat exchange section 81 and the cooling liquid, the heat exchange unit 8 effectively reduces the temperature of the cooling liquid. Therefore, since the liquid crystal panel 341 is cooled down by the cooling liquid of which the temperature is effectively reduced, it is possible to cool down the liquid crystal panel 341 effectively.

The outflow portion 74 is provided on the side surface portion 71F at a position adjacent to the lower surface portion 71B. The position adjacent to the lower surface portion 71B is where the height H1 from the lower surface portion 71B corresponds to the half or less of the height H2 of the storage unit body 71. Accordingly, the outflow portion 74 is positioned downward in the storage unit body 71, in a state in which the projector 1 is installed at the normal posture.

Therefore, when the projector 1 is installed at the normal posture, bubbles captured in the upper space Ar1 inside the storage unit body 71 at the upper side are prevented from flowing to the outside through the outflow portion 74.

The outflow portion 74 is provided at a substantially central position in the widthwise direction (Z-axis direction) of the storage unit body 71 along the projection direction R. Accordingly, the outflow portion 74 may be positioned at a substantially central position in the upward and downward direction of the storage unit body 71, in a state in which the projector 1 is installed at the upward projection posture or the downward projection posture.

Therefore, when the projector 1 is installed at the upward projection posture or the downward projection posture, bubbles captured in the upper space Ar1 or Ar3 inside the storage unit body 71 at the upper side are prevented from flowing to the outside through the outflow portion 74.

In the above-described embodiment, three postures including the normal posture (the suspended posture), the upward projection posture, and the downward projection posture are taken as posture examples of the projector 1, in order to simplify the descriptions. However, the projector 1 may be set at such a posture that the projector 1 is inclined at a certain angle between the normal posture and the upward or downward projection posture. That is, even when the projector 1 is installed at various postures, it is possible to obtain the above-described effects.

The invention is not limited to the above-described embodiment, but modifications and variations can be made without departing from the spirit and scope of the invention.

In the above-described embodiment, the liquid crystal panel 341 is adopted as a cooling target. Without being limited thereto, however, optical elements including the light source devices 31A and 31B, the polarization conversion element 323, the incident-side polarization plate 342, and the emission-side polarization plate 343, a power supply device for supplying electric power to components inside the projector 1, or a control device for controlling the liquid crystal panel 341 and so on may be targets to be cooled down.

In the above-described embodiment, the outflow portion 74 is provided on the side surface portion 71F at a position adjacent to the lower surface portion 71B. Without being limited thereto, however, the outflow portion 74 may be disposed at any position, as long as the height H1 from the lower surface portion 71B corresponds to the half or less of the height H2 of the storage unit body 71.

In the above-described embodiment, the arrangement order of the respective units 5 to 8 constructing the liquid-cooling device 4 is not limited to the order described in the embodiment, but the units 5 to 8 may be disposed in a different order.

In the above-described embodiment, the three liquid crystal panels 341 are provided. However, the number of crystal panels is not limited thereto, but may be set to one, two, or four or more.

In the above-described embodiment, light modulation elements other than liquid crystals, such as devices using micro mirrors, may be adopted as the light modulation elements, in addition to the transmission-type or reflection-type liquid crystal panels.

In the above-described embodiment, the front-type projector which performs projection from a direction in which a screen is observed is taken as an example. However, the invention may be applied to a rear-type projector which performs projection from the opposite side of the direction in which the screen is observed.

In the projector according to the embodiment of the invention, a cooling target is effectively cooled down by cooling liquid, even when the projector is installed at various postures. Therefore, the projector may be utilized as a projector which is used for presentation or as a home theater.

The present application claim priority from Japanese Patent Application No. 2009-074215 filed on Mar. 25, 2009, which is hereby incorporated by reference in its entirety.

What is claimed is:

1. A liquid-cooling device configured to cool down a cooling target in a projector using cooling liquid, the liquid-cooling device comprising:
    a liquid storage unit having a storage unit body that temporarily stores the cooling liquid therein;
    an inflow portion provided in the storage unit body, the inflow portion configured to allow the cooling liquid to flow into the storage unit body from the outside; and
    an outflow portion provided in a surface of the storage unit body, the outflow portion configured to allow the cooling liquid stored in the storage unit body to flow out to the outside of the storage unit body in a direction substantially orthogonal to a direction in which the cooling liquid flows into the inflow portion of the storage unit body,
    wherein
    the liquid storage unit is disposed such that the cooling liquid flows out of the outflow portion in a direction substantially orthogonal to a projection direction of an image from the projector and substantially parallel to a horizontal plane,
    the outflow portion is provided at a position where a height from a lower surface portion of the storage unit body is less than half of a height from the lower surface portion of the storage unit body to an upper surface portion thereof,
    the outflow portion is provided at a position adjacent an end of the surface of the storage unit body in the height direction, and
    the outflow portion is provided at a substantially central position in the widthwise direction of the storage unit body along the projection direction.

2. A projector comprising:
    a light source device;
    a light modulation element configured to modulate light flux emitted from the light source device in accordance with image information to form image;
    a projection optical device configured to project the image formed; and
    a liquid-cooling device to cool a cooling target, the liquid-cooling device including:
        a liquid storage unit having a storage unit body that temporarily stores the cooling liquid therein;
        an inflow portion configured to allow the cooling liquid to flow into the storage unit body from the outside; and
        an outflow portion provided in a surface of the storage unit body and configured to allow the cooling liquid stored in the storage unit body to flow out to the outside in a direction substantially orthogonal to a direction in which the cooling liquid flows into the storage unit body through the inflow portion, wherein the liquid storage unit is disposed such that the cooling liquid flows out of the outflow portion in a direction substantially orthogonal to a projection direction of the image from the projector and substantially parallel to a horizontal plane, the outflow portion is provided at a position where a height from a lower surface portion of the storage unit body is less than half of a height from the lower surface portion of the storage unit body to an upper surface portion thereof, the outflow portion is provided at a position adjacent an end of the surface of the storage unit body in the height direction, and the outflow portion is provided at a substantially central position in the widthwise direction of the storage unit body along the projection direction.

3. The liquid-cooling device according to claim 1, further comprising;

a heat exchange section constructed to allow the cooling liquid to flow into and out, the heat exchange section exchanging heat with the cooling liquid circulating therein;

a thermoelectric conversion element including a heat suction surface and a heat dissipation surface, the heat suction surface connected to the heat exchange section so as to transfer heat;

a heat-dissipation-side heat transmission member connected to the heat dissipation surface to transfer heat; and a compartment plate disposed to compartmentalize the heat exchange section and the heatdissipation-side heat transmission member, the compartment plate including an opening potion into which the thermoelectric conversion element is fitted, and formed of material having a low thermal conductivity.

4. The liquid-cooling device according to claim 3, wherein a thermal conductivity of the material forming the compartment plate is equal to or less than 0.9 W/ (m·K).

5. A liquid-cooling device configured to cool down a cooling target in a projector using cooling liquid, the liquid-cooling device comprising:

a liquid storage unit having a storage unit body that temporarily stores the cooling liquid therein, the liquid storage unit extending longitudinally in a height direction;

an inflow portion provided in a first surface portion of the storage unit body, the inflow portion configured to allow the cooling liquid to flow into the storage unit body from the outside; and an outflow portion provided in a second surface portion of the storage unit body, the outflow portion configured to allow the cooling liquid stored in the storage unit body to flow out to the outside of the storage unit body in a direction substantially orthogonal to a direction in which the cooling liquid flows into the inflow portion of the storage unit body, wherein the liquid storage unit is disposed such that the cooling liquid flows out of the outflow portion in a direction substantially orthogonal to a projection direction of an image from the projector and substantially parallel to a horizontal plane, the first surface portion of the storage unit body and the second surface portion of the storage unit body each extend longitudinally in the height direction, and the outflow portion is provided at a position where a height from a lower surface portion of the storage unit body is less than half of a height from the lower surface portion of the storage unit body to an upper surface portion thereof.

6. The liquid-cooling device according to claim 5, wherein the first surface portion of the storage unit body intersects the second surface portion of the storage unit body.

7. A liquid-cooling device configured to cool down a cooling target in a projector using cooling liquid, the liquid-cooling device comprising:

a liquid storage unit having a storage unit body that temporarily stores the cooling liquid therein;

an inflow portion provided in the storage unit body, the inflow portion configured to allow the cooling liquid to flow into the storage unit body from the outside in a first direction;

an outflow portion provided in the storage unit body, the outflow portion configured to allow the cooling liquid stored in the storage unit body to flow out to the outside of the storage unit body in a second direction substantially orthogonal to the first direction; and an injection portion provided in the storage unit body, the injection portion configured to allow additional cooling liquid to flow into the storage unit body from the outside in a third direction substantially orthogonal to each of the first direction and the second direction, wherein the liquid storage unit is disposed such that the cooling liquid flows out of the outflow portion in a direction substantially orthogonal to a projection direction of an image from the projector and substantially parallel to a horizontal plane.

* * * * *